June 15, 1926.
W. E. SCHNEIDER ET AL
AUTOMOBILE LOCK
Filed April 25, 1925
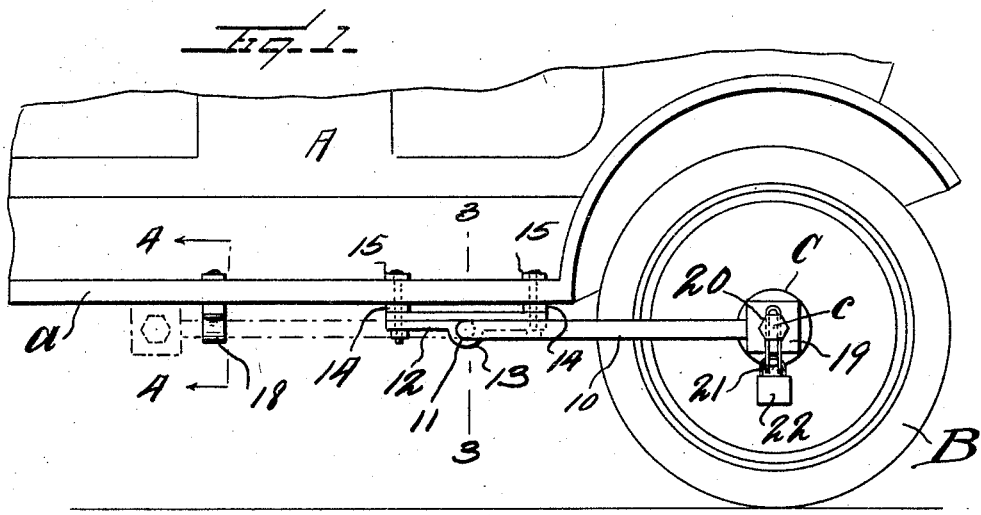
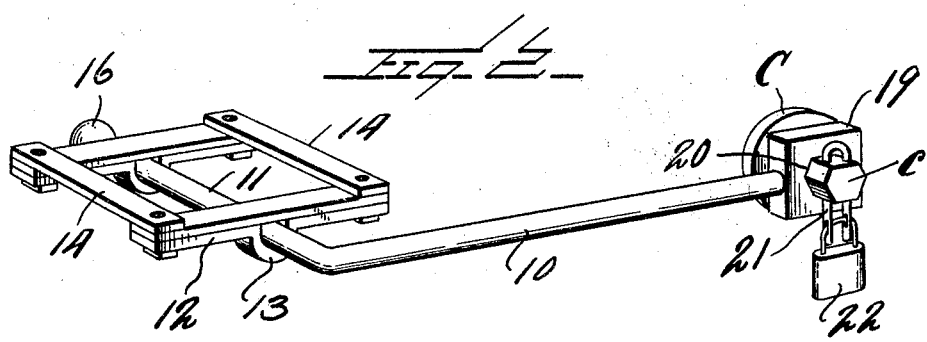
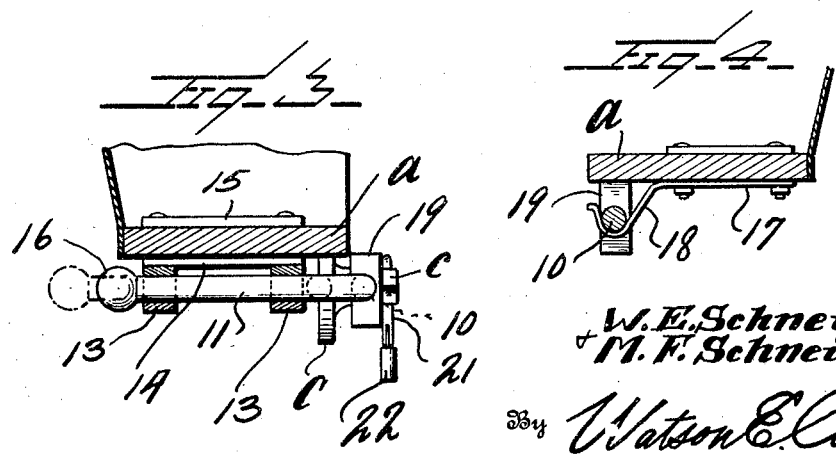
Inventors
W. E. Schneider
M. F. Schneider
By Watson E. Coleman
Attorney Patented June 15, 1926.

1,589,233

UNITED STATES PATENT OFFICE.

WALTER E. SCHNEIDER AND MERRITT F. SCHNEIDER, OF QUINCY, CALIFORNIA.

AUTOMOBILE LOCK.

Application filed April 25, 1925. Serial No. 25,881.

This invention relates to means for locking automobiles, and particularly to means whereby one of the driving wheels of an automobile will be locked from rotation either to prevent the car from being stolen or operated without proper authority.

A further object is to provide a device of this character which is adapted to engage over the hub cap of the automobile and lock the hub cap from rotation and thus lock the drive wheel from rotation.

A still further object is to provide a device of this character which is normally disposed upon the running board of the machine but which may be shifted into engagement with a rear hub cap when desired.

Our invention is illustrated in the accompanying drawings, wherein:

Figure 1 is a fragmentary side elevation of a motor car having our improved lock applied to one of the rear driving wheels thereof;

Figure 2 is a perspective view of the brake and lock showing it in applied position upon a hub cap;

Figure 3 is a section on the line 3—3 of Figure 1;

Figure 4 is a section on the line 4—4 of Figure 1.

Referring to these drawings, it will be seen that we have illustrated a portion of an ordinary automobile, this automobile being designated generally A, and having a running board $a$, and the rear driving wheel B having a hub cap C. This hub cap is shown as having a many-sided, as for instance, hexagonal projection $c$. Our device comprises an arm or rod 10 which is angularly bent so as to provide a portion 11 disposed transversely of the running board and mounted upon this running board for movement around the axis 11 from a position in engagement with the hub cap C to an inoperative position.

For the purpose of supporting the axis of this arm 10, we provide longitudinally extending, metallic strips 12, each of which is formed at its middle to provide a recess 13 constituting a bearing for the angular portion 11. These irons 12 are disposed upon the bottom of the running board and connected by means of transverse irons 14, and disposed upon the top of the running board are the longitudinally extending irons 15. Bolts pass through these irons and through the running board and into the irons 12 and 14, thus holding this frame, as it may be termed, together.

The inner end of the portion 11 of arm 10 is provided with the knob or ring 16 constituting a stop, and the length of the portion 11 is approximately one and a half inches greater than the width of the running board $a$. Also attached to the under face of the running board is a supporting iron 17 which is bolted to the running board and which has its outer end formed with a hook or seat 18 upon which the arm 10 is adapted to rest under normal circumstances. Carried at the extremity of the arm 10 is a plate 19 formed at its center with a rectangular or hexagonal opening 20 which is adapted to fit upon the projecting portion $c$ of the hub cap C and engaged therewith so that when this plate 19 is in position it locks the hub cap from rotation. The hub cap C is preferably perforated for the passage of the shank of a U-shaped locking hasp 21 which is adapted to pass through the perforations in the hub cap and which at its end is adapted to be engaged by the hasp of a padlock 22. It will be seen that with this device under ordinary circumstances the arm 10 rests upon the rest or support 17 and is practically entirely out of the way.

When it is desired to use the device, the arm 10 is shifted outward, this being permitted by the length of the portion 11, and then is turned upon this portion 11 so as to carry the locking plate 19 into position opposite the hub cap. This arm is then shifted inward so as to carry the aperture 20 in the plate 19 over the hub cap and then the U-shaped hasp 21 is passed through the hub cap or otherwise engaged therewith so as to lock the plate in position and the padlock or other lock is engaged with the hasp. Two of these devices are used, one for each rear wheel.

Under these circumstances it is obvious that both of the driving wheels cannot possibly rotate under power and the automobile is, therefore, locked from movement and cannot be stolen. It is obvious that if these devices are in locked position and the car is moved backward or forward, one of the hub caps will tighten, though the other may loosen, so that one hub cap will be bound to be locked under these circumstances. The member 17 is preferably of spring material so that the seat 18 will spring upward and hold the arm 10 from any accidental detachment but it will yield to permit the arm 10 to be shifted outward. This member 17 may be disposed entirely beneath the running board if desired and thus the plate 19 and the arm 10 be also entirely disposed beneath the running board.

We claim:—

1. The combination with an automobile, of means for locking a driving wheel from movement comprising an arm mounted upon the automobile for movement parallel to the axis of the wheel and for movement at right angles to the axis of the wheel, this arm carrying a locking plate having an aperture adapted to engage over and lock the hub cap of the wheel from movement, and means for locking the locking plate upon the hub cap.

2. The combination with an automobile having a running board and a driving wheel equipped with a hub cap, of means for locking the driving wheel from movement comprising an arm pivotally mounted upon the running board, the arm carrying a locking plate formed with an aperture adapted to fit the hub cap, the arm being movable from an inoperative position to a position to carry the plate into engagement with the hub cap, and means for locking the plate upon the hub cap.

3. The combination with an automobile having a running board and a driving wheel equipped with a hub cap, of means for locking the driving wheel from movement comprising an arm pivotally mounted upon the running board, the arm carrying a locking plate formed with an aperture adapted to fit the hub cap, the arm being movable from an inoperative position to a position to carry the plate into engagement with the hub cap, means for locking the plate upon the hub cap comprising a hasp passing through the hub cap, and a lock for the hasp.

4. The combination with an automobile having a running board and a rear wheel equipped with a hub cap, of means for locking the rear wheel from movement comprising an arm having an angularly disposed portion extending transversely across the running board beneath the same, a bearing member supported upon the under face of the running board and having bearings through which the angularly bent portion of the arm passes, this angularly bent portion having movement through said bearings at right angles to the line of draft, the extremity of the arm remote from said axis being provided with a locking plate having an aperture adapted to fit over the hub cap and interlock therewith, a rest mounted upon the under face of the running board and with which the arm is adapted to be engaged when the arm is turned into an inoperative position, and means for locking the plate upon the hub cap.

In testimony whereof we hereunto affix our signatures.

WALTER E. SCHNEIDER.
MERRITT F. SCHNEIDER.